(12) United States Patent
Kann et al.

(10) Patent No.: US 11,788,919 B2
(45) Date of Patent: Oct. 17, 2023

(54) COORDINATED ACOUSTIC LEAK DETECTION SENSOR SAMPLING

(71) Applicant: Itron, Inc., Liberty Lake, WA (US)

(72) Inventors: James Lee Kann, Mica, WA (US); Philip Alan Cole, Stow, MA (US)

(73) Assignee: Itron, Inc., Liberty Lake, WA (US)

( * ) Notice: Subject to any disclaimer, the term of this patent is extended or adjusted under 35 U.S.C. 154(b) by 28 days.

(21) Appl. No.: 17/497,493

(22) Filed: Oct. 8, 2021

(65) Prior Publication Data

US 2023/0111271 A1 Apr. 13, 2023

(51) Int. Cl.
*G01M 3/24* (2006.01)
*F17D 5/06* (2006.01)
*G01M 3/28* (2006.01)

(52) U.S. Cl.
CPC .......... *G01M 3/243* (2013.01); *G01M 3/2815* (2013.01)

(58) Field of Classification Search
CPC .... G01M 3/00; G01M 3/24–28; G01M 3/243; G01M 3/2815; F17D 5/00–06
See application file for complete search history.

(56) References Cited

U.S. PATENT DOCUMENTS

| | | | |
|---|---|---|---|
| 5,038,614 A | 8/1991 | Bseisu et al. | |
| 5,974,862 A | 11/1999 | Lander et al. | |
| 6,453,247 B1 | 9/2002 | Hunaidi | |
| 6,567,006 B1 | 5/2003 | Lander et al. | |
| 6,957,157 B2 | 10/2005 | Lander | |
| 7,705,721 B1 | 4/2010 | Chen et al. | |
| 8,643,716 B1 | 2/2014 | Kalokitis et al. | |
| 10,359,335 B2 | 7/2019 | Cole | |
| 10,527,515 B2 * | 1/2020 | Brennan, Jr. | G01M 3/243 |
| 10,551,274 B2 | 2/2020 | Cole | |
| 10,704,982 B2 | 7/2020 | Cole | |
| 2001/0045129 A1 | 11/2001 | Williams et al. | |
| 2003/0204338 A1 * | 10/2003 | Martinek | G01M 3/243 702/51 |

(Continued)

FOREIGN PATENT DOCUMENTS

| | | |
|---|---|---|
| CN | 102563361 A | 7/2012 |
| EP | 2929300 B1 | 2/2019 |

(Continued)

OTHER PUBLICATIONS

Bachner, "Piping for New Construction-Plastic vs. Copper," Oct. 30, 2015, retrieved online [http://healthybuildingscience.com/2015/10/30/new-construction-piping-pla- stic-vs-copped/] retrieved on on Aug. 11, 2021, 6 pages.

(Continued)

*Primary Examiner* — Nguyen Q. Ha
(74) *Attorney, Agent, or Firm* — Lee & Hayes, P.C.

(57) ABSTRACT

A leak detection sensor may be capable of dynamically adjusting a sampling time for acoustic data based on monitored fluid flow. The leak detection sensor monitors leak detection information associated with a fluid in a fluid transporting medium over a predetermined time interval, where the leak detection information comprises flow and pressure of the fluid in the fluid transporting medium, and processing the leak detection data monitored at the sampling time in the predetermined time interval, where the sampling time is determined based at least in part on the monitored flow of the fluid.

20 Claims, 6 Drawing Sheets

(56) References Cited

U.S. PATENT DOCUMENTS

| | | | |
|---|---|---|---|
| 2006/0036404 A1 | 2/2006 | Wiklund et al. | |
| 2006/0225507 A1 | 10/2006 | Paulson | |
| 2008/0150750 A1 | 6/2008 | Parris et al. | |
| 2010/0106434 A1 | 4/2010 | Killion et al. | |
| 2011/0093220 A1 | 4/2011 | Yang et al. | |
| 2011/0301882 A1 | 12/2011 | Andersen | |
| 2012/0007743 A1 | 1/2012 | Solomon | |
| 2013/0036796 A1 | 2/2013 | Fleury, Jr. et al. | |
| 2013/0101127 A1 | 4/2013 | Buchmann | |
| 2014/0121999 A1 | 5/2014 | Bracken et al. | |
| 2014/0290343 A1 | 10/2014 | Kulkarni et al. | |
| 2015/0052979 A1 | 2/2015 | Cho et al. | |
| 2015/0330863 A1 | 11/2015 | Dotan et al. | |
| 2017/0234709 A1* | 8/2017 | Mackie | G01M 3/243 73/861.08 |
| 2017/0307466 A1 | 10/2017 | Brennan, Jr. et al. | |
| 2018/0094775 A1 | 4/2018 | Jacobson et al. | |
| 2018/0172546 A1 | 6/2018 | Calzavara et al. | |
| 2019/0137353 A1 | 5/2019 | Cole | |
| 2019/0154535 A1 | 5/2019 | Cole | |
| 2023/0008984 A1* | 1/2023 | Dupont | G01F 25/10 |

FOREIGN PATENT DOCUMENTS

| | | | |
|---|---|---|---|
| FR | 2910619 A1 | 6/2008 | |
| GB | 2209218 | 5/1991 | |
| WO | WO-2008029681 A1 * | 3/2008 | G01M 3/2815 |
| WO | WO2012129101 | 9/2012 | |
| WO | WO2012136209 | 10/2012 | |
| WO | WO2017106490 A1 | 6/2017 | |
| WO | WO-2023030597 A1 * | 3/2023 | G01M 3/28 |

OTHER PUBLICATIONS

Connell et al., "PEX and PP Water Pipes: Assimilable Carbon, Chemicals, and Odors," abstract, American Water Works Association Journal, issued Apr. 2016, vol. 108, No. 4, 1 page.

Lechevallier, "Conditions favouring coliform and HPC bacterial growth in drinking-water and on water contact surfaces," 2003 World Health Organization (WHO), Heterotrophic Plate Counts and Drinking-water Safety, IWA Publishing, London, UK, copyright 2003, pp. 177-196, 21 pages.

Lee, "An Evaluation of Microbial and Chemical Contamination Sources Related to the Deterioration of Tap Water Quality in the Household Water Supply System," International Journal of Environmental Research and Public Health, Sep. 2013, 10(9): 4143-4160, retrieved at [https://www.ncbi.nlm.nih.gov/pmc/articles/PMC3799508], published online Sep. 6, 2013, 18 pages.

Notice of Allowance dated Mar. 1, 2019, for U.S. Appl. No. 15/589,497, 9 pages.

Non-Final Office Action dated Oct. 1, 2019, for U.S. Appl. No. 15/819,677, 13 pages.

Non-Final Office Action dated Oct. 8, 2019, for U.S. Patent Application No. 16/424,725, 11 pages.

Non-Final Office Action dated Sep. 28, 2018, for U.S. Appl. No. 15/589,497, 13 pages.

Australian Notice of Acceptance dated Sep. 3, 2020, for Australian Patent Application No. 2018228866, 3 pages.

Notice of Acceptance dated Oct. 8, 2020, for Australian Patent Application No. 2018366259, 3 pages.

Australian Office Action dated Aug. 26, 2020, for Australian Patent Application No. 2018228866, 3 pages.

Extended European Search Report dated Feb. 10, 2023 for European Patent Application No. 221979443.6, 11 pages.

Notice of Allowance dated Oct. 2, 2019, for U.S. Appl. No. 15/808,539, 6 pages.

Notice of Allowance dated Feb. 28, 2020, for U.S. Appl. No. 16/424,725, 8 pages.

Office Action for U.S. Appl. No. 17/497,493, dated Feb. 2, 2023, James Lee Kann, "Coordinated Acoustic Leak Detection Sensor Sampling", 10 pages.

Non-Final Office Action dated Jun. 26, 2019, for U.S. Appl. No. 15/808,539, 9 pages.

PCT International Search Report and Written Opinion dated Jun. 1, 2018, for PCT International Application No. PCT/US2018/020439, 14 pages.

PCT International Search Report and Written Opinion dated Feb. 19, 2019, for PCT International Application No. PCT/US2018/059959, 14 pages.

* cited by examiner

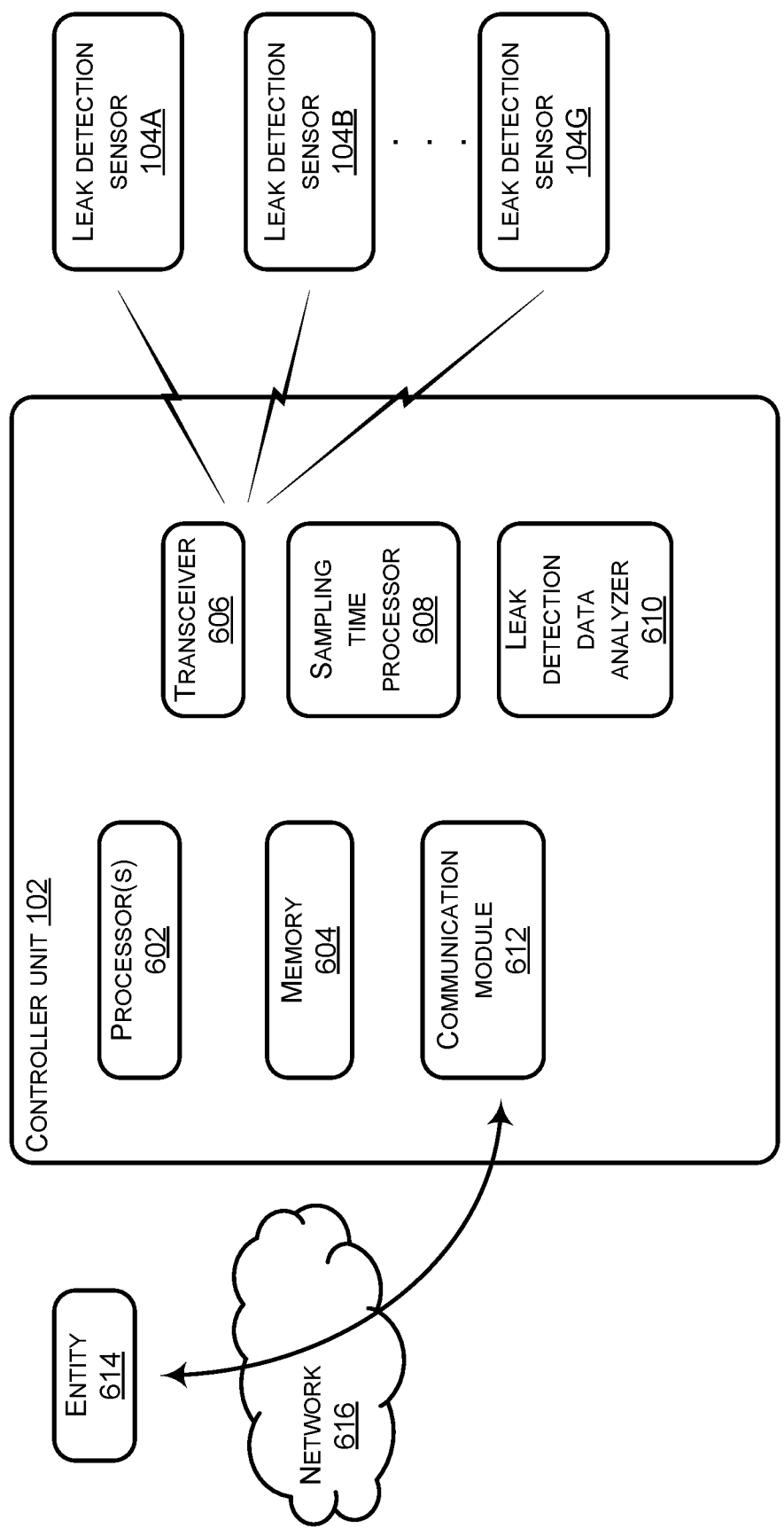

COORDINATED ACOUSTIC LEAK DETECTION SENSOR SAMPLING

TECHNICAL FIELD

The present disclosure generally relates to the field of leak detection systems, and more specifically to methods and apparatus for coordinating leak data sampling for improving leak detection accuracy.

BACKGROUND

Leaks in water pipes create noise as water leaves the pipe. Some known leak detection systems used in utility distribution systems (e.g. fluid utility distribution systems such as for gas and water) employ leak detection sensors with acoustic sensors that detect noise and/or characteristic sounds, which may be indicative of a potential leak. In particular, these known leak detection sensors are usually coupled to a pipe and/or portion of a fluid delivery system, and utilize parameters, such as amplitude and/or a time-history of acoustic signals or samples to determine a presence of a potential leak. Such leak detection sensors may take acoustic samples which are then sent to a headend application to be combined with samples from other leak detection sensors and analyzed to determine if there is a sound, or an acoustic signature, that is indicative of a leak.

However, use of these parameters can be inaccurate, and/or the sampled data can be masked, if the acoustic data were sampled during a period of water usage and/or localized noise.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates an example block diagram of a controller unit.

DETAILED DESCRIPTION

Figure 1:
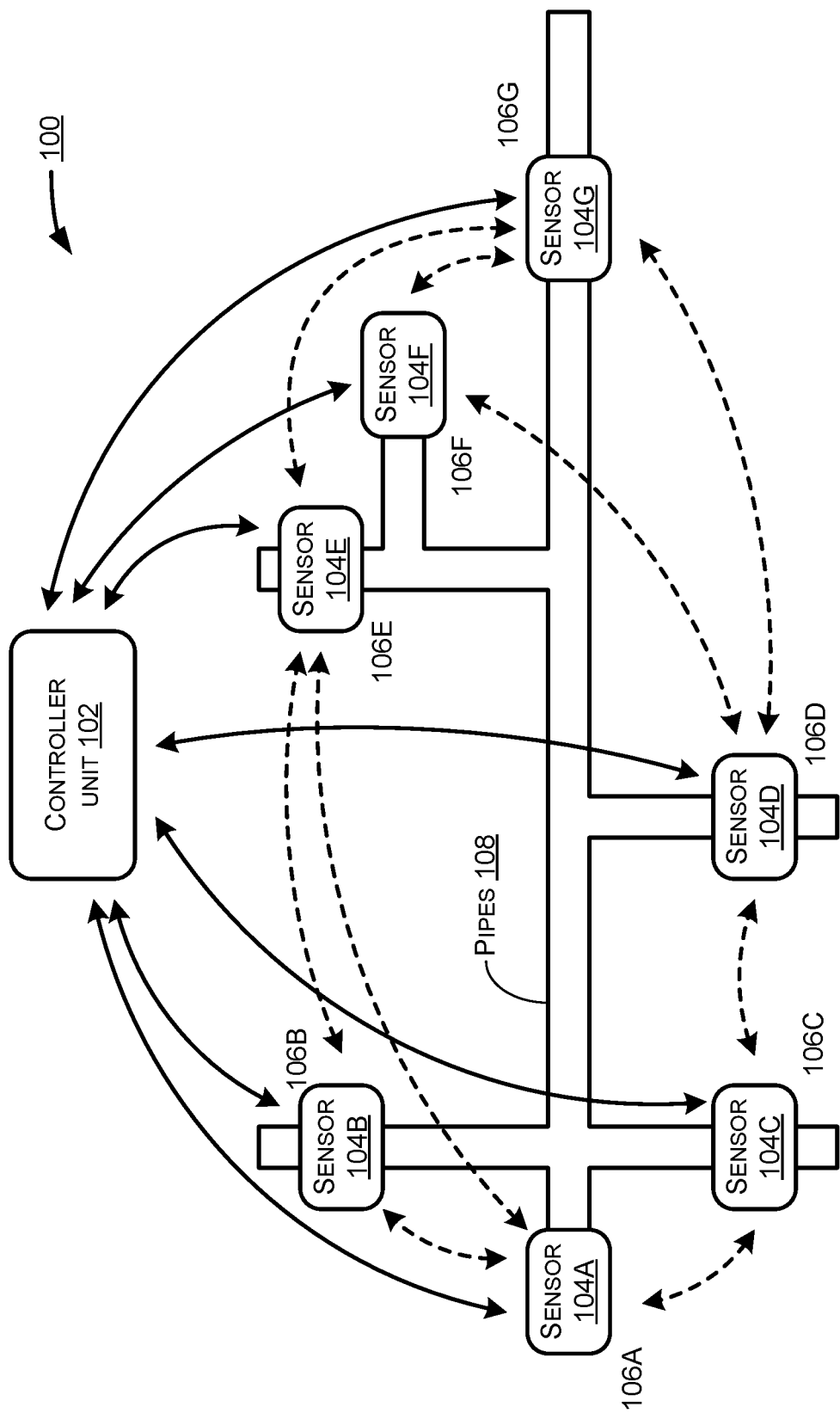
FIG. 1 illustrates an example schematic diagram of a leak detection system comprising a controller unit and a plurality of leak detection sensors distributed over a network of pipes.

A method and apparatus for coordinating leak data sampling for improving leak detection accuracy are disclosed. Some leak detection systems employ leak detectors with acoustic sensors that detect noise and/or characteristic sounds, which may be indicative of a potential leak. However, with these systems, determination of leaks and/or leak patterns can be difficult due to noise present in the system such as external noise, slow drift of leak patterns and/or irregular use (e.g., irregular or highly variable utility system usage).

These systems may be statically programmed to sample acoustic data at night when water usage and external noise are typically low. However, depending on locations of leak detection sensors of the leak detection system, there may be nearby noise sources with irregular cycles. That is, the noise may not be the lowest at night, such as a sprinkler system watering at night, a construction site active at night, a 24-hour business still operating at night, and the like.

A leak detection sensor, or an endpoint device, that supports both leak sampling capabilities and consumption recording may monitor presence of a fluid, such as water or gas, in a fluid transporting medium, such as a pipe, hose, flange, faucet, valve, and the like, herein forward referred to as a pipe or pipes, and may monitor or detect acoustic noise when the fluid consumption at a service point it is attached to, i.e., the location where the water or gas is being provided, is at a minimum over a predetermined time interval such as a day, i.e., a 24-hour period. The leak detection sensor may be a single device or comprise a plurality of devices coupled together. The plurality of devices may include, for example, a fluid consumption measuring device, a timer or timing device, an acoustic sensor, a fluid pressure measuring device, and the like, and may be coupled wirelessly or physically via communication wires and/or shared housing (s). Because when the fluid consumption is low, a noise from the fluid flow is reduced, thus making it an ideal time, which may be referred to as a quiet time or a sampling time, to sample acoustic data in the pipe for detecting a potential leak. The sampling time may also be optimized and/or predicted based on a historical flow pattern recorded by the leak detection sensor or by a meter, headend unit, or other devices coupled to the leak detection sensor over a longer period of time such as a week or a month which may be a rolling/running week or month. A diurnal flow pattern may be derived based on the historical flow pattern and utilized to potentially forecast a day of the week for the optimal recording period. Accordingly, the leak detection sensor may determine, and revise as needed, the quiet time, that is when to sample the acoustic data on a daily basis, based on the monitored fluid flow. The monitored flow includes a monitored quantity of the fluid and a flow rate of the fluid, which may be used interchangeably. In addition, the leak detection sensor may also monitor fluid pressure in the pipe at the service point. The sampling time may include one or more sampling times within a time interval if appropriate. Because the fluid pressure is generally known to be at the highest when the fluid flow is at its lowest, the fluid pressure data may also be used in determining the quite time.

While an externally powered leak detection sensor, such as one powered by an external power supply connected to an AC outlet, may continuously monitor the fluid flow, the fluid pressure, and the acoustic data, a battery-powered leak detection sensor may, instead, monitor the fluid flow, the fluid pressure, and the acoustic data periodically, for example, every five minutes for a monitoring period of five seconds, over the 24-hour period to conserve the battery power. However, for an urgent situation, such as a newly suspected leak, running diagnostics, or inspecting local pipes, the battery-powered leak detection sensor may also be controlled to continuously monitor the fluid flow, the fluid pressure, and the acoustic data for a certain period of time.

For example, a group of leak detection sensors for water may be attached to a network of water pipes in a given area, and each leak detection sensor may monitor the water flow, the water pressure, and the acoustic data over a day to determine a respective sampling time based on when a respective monitored water flow is at the lowest and/or a respective monitored pressure is at the highest during the day. Topology of the network of water pipes and a location of each leak detection sensor on the water pipes may be recorded and used in determining a leak location. Each leak detection sensor may then determine its own daily sampling time individually. Alternatively, monitored water flow and pressure data may be communicated among the group of leak detection sensors and analyzed via distributed intelligence or edge computing at one or more of the leak detection sensors to determine, or coordinate, an individual sampling time for each leak detection sensor, a common sampling time for the group of leak detection sensors, or one or more sampling times for one or more subgroups of the group of leak detection sensors based on the topology and leak detection sensor locations.

Alternatively, a controller unit, or a headend device, may receive and analyze monitored water flow and pressure data from the group of leak detection sensors and determine, or coordinate, the individual sampling time for each leak detection sensor, the common sampling time for the group of leak detection sensors, or one or more sampling times for one or more subgroups of the group of leak detection sensors based on the topology and leak detection sensor locations.

In addition to sampling the acoustic data at the sampling time, the leak detection sensor may also sample acoustic data at a time offset by a predetermined offset time interval from the sampling time comparison to avoid unexpected noise. The sampling time may also be re-determined and adjusted periodically to account for changes in water, or gas, usage patterns based on the day of the week, ex., a weekday vs. weekend, local changes, such as residential turn-over, new constructions, and seasonal changes, such as a sprinkler usage. Because acoustic information collected by the leak detection sensor may be affected by its environment and conditions, the leak detection sensor may be calibrated based on a material of the pipe, such as copper and PVC, a location, such as a distance from other leak detection sensors of the group and/or a distance from a consumption point, and an expected fluid pressure. Additionally, if a leak detection sensor detects a noise in a given time period outside of the sampling time, that leak detection sensor may signal the other leak detection sensors to sample the acoustic data to determine if the noise is local or regional.

At the sampling time, the leak detection sensor may record acoustic data present in the pipe, analyze the acoustic data by performing spectral analysis on the acoustic data, and identify a noise and/or leak signature. Examples of the spectral analysis include methods described in U.S. Pat. Nos. 10,359,335, 10,551,274, 10,704,982, and US Patent Application Publication Number 2019/0154535, entireties of which are herein incorporated by reference.

Alternatively, the acoustic data may be communicated among the group of leak detection sensors and analyzed via distributed intelligence or edge computing at one or more of the leak detection sensors to determine a leak location, or be transmitted from each leak detection sensor to the controller unit for analysis to determine the leak location based on the topology of the pipes and leak detection sensor locations. The leak location includes a pre-localized leak location. For example, if a leak detection sensor records a leak, i.e., a loud acoustic signal indicative of a leak, then a location of the leak may be estimated to be near the location of the leak detection sensor, that is, the pre-localized leak location. Based on the acoustic signal indicative of the same leak by nearby leak detection sensors, the leak location may be determined by triangulating based on the locations of the leak detection location and the topology of the pipe network. The leak detection sensors may be calibrated such that if a signal, from a location having the same distance to two leak detection sensors, was captured by the two leak detection sensors, both leak detection sensors would record the signal with equal amplitude. Cross correlation may also be performed based on a time synchronized data, i.e., captured acoustic signal.

FIG. 1 illustrates an example schematic diagram of a leak detection system 100 comprising a controller unit 102 and a plurality of leak detection sensors 104 distributed at multiple locations 106 over a network of pipes 108. In this example, seven leak detection sensors, 104A-104G, are shown to be attached to various locations, 106A-106G, of the network of pipes 108. In general, a leak detection sensor 104 may refer to a single leak detection sensor or one or more leak detection sensors.

A leak detection sensor 104 may monitor leak detection information, such as the flow and the pressure of the fluid and leak detection data, in the pipes 108 at its corresponding location 106 over a time interval, which may be predetermined such as a 24-hour period, and manage the leak detection data monitored at a sampling time where the sampling time may be determined based at least in part on the monitored flow and/or pressure. For example, each leak detection sensor 104 may collect and store the leak detection information locally and analyze the leak detection data. As shown with dotted lines, the leak detection sensors 104 may also communicate with each other and coordinate to manage the leak detection information and the sampling time. In addition, or alternatively, the leak detection sensors 104 may communicate with the controller unit 102 to have the controller unit 102 manage the leak detection information and the sampling time.

Figure 2:
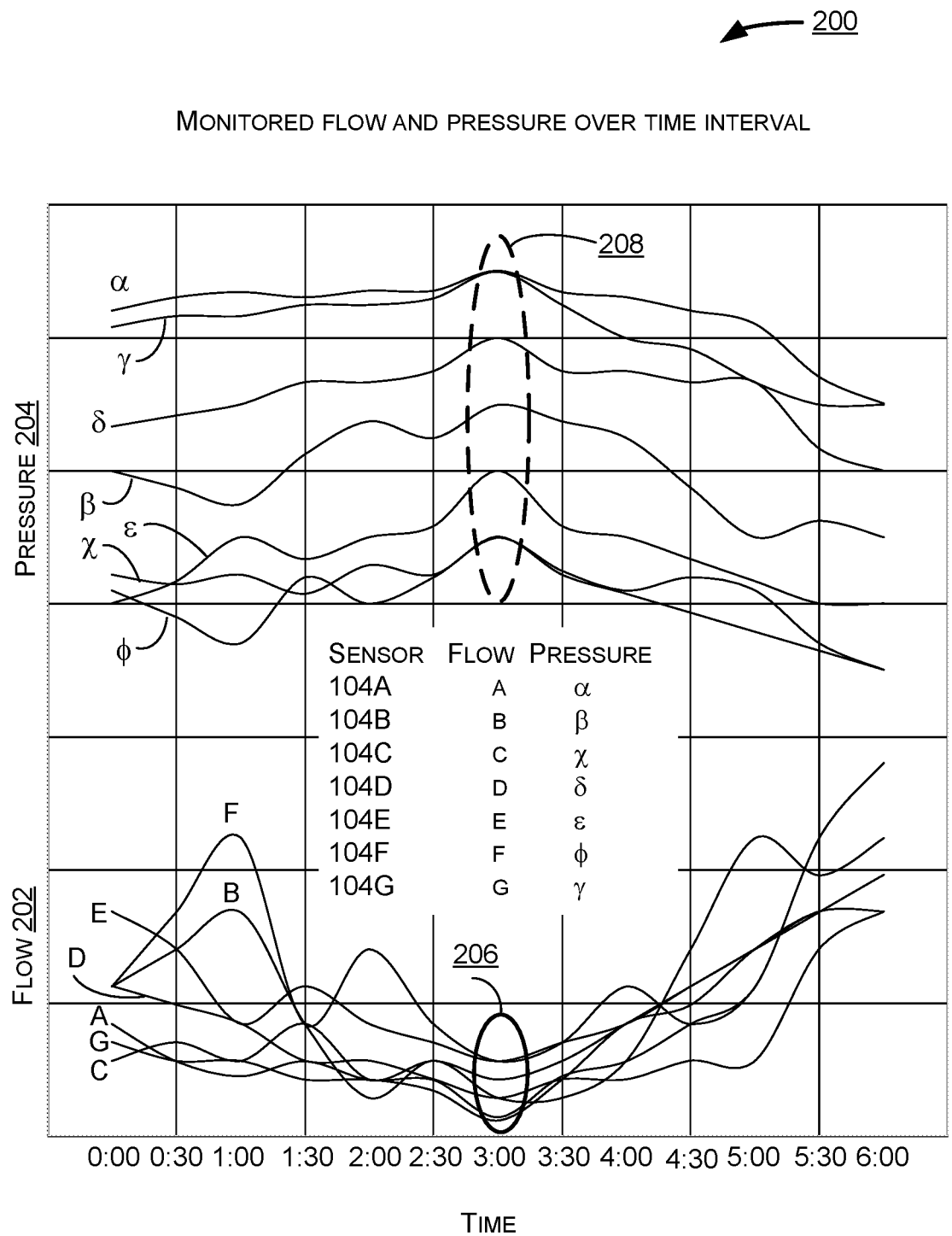
FIG. 2 illustrates an example graph of the monitored flow and the monitored pressure by the leak detection sensors over a portion of a predetermined time interval.

FIG. 2 illustrates an example graph 200 of the monitored flow 202 and the monitored pressure 204 by the leak detection sensors 104 over a portion, from time 0:00 to 6:00 AM, of the predetermined time interval.

The graphs of monitored flow 202 (A-G) show that the monitored flow of each leak detection sensor 104 is the lowest at 3:00 AM, as indicated as a solid-line circle 206, and the graphs of monitored pressure 204 ($\alpha$-$\gamma$) show that the monitored pressure of each leak detection sensor 104 is the highest at 3:00 AM, as indicated by a dotted-line circle 208. As discussed above, the sampling time may be set to when the fluid consumption is the lowest because the noise from the fluid flow is reduced and/or minimized, in this example 3:00 AM as indicated by the solid-line circle 206. Additionally, the monitored pressure 204 of the fluid may also be utilized in determining and setting the sampling time because the fluid pressure is generally known to be at the highest when the fluid flow is at the lowest. In this example, the highest pressure for the leak detection sensors 104 also occurs at 3:00 AM as indicated by the dotted-line circle 208. However, the sampling time may not be the same time for all of the leak detection sensors 104 based on the occurrence of the minimum flow at different times for different leak detection sensors.

Figure 3:
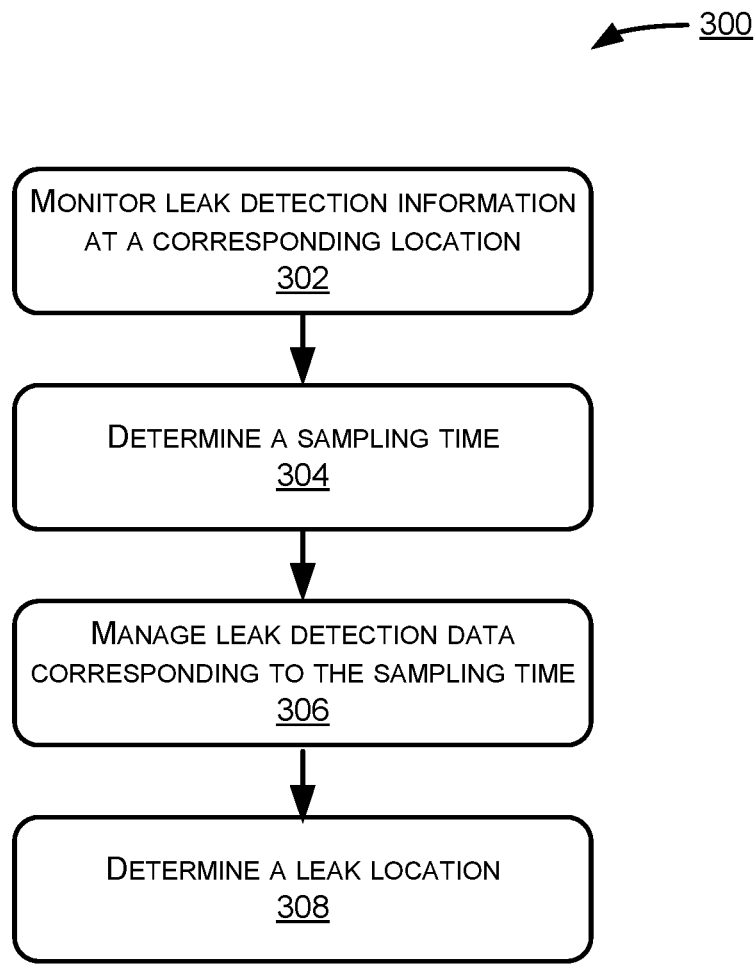
FIG. 3 illustrates an example process for processing leak detection data monitored by the leak detection sensors at the sampling time.

FIG. 3 illustrates an example process 300 for processing leak detection data monitored by the leak detection sensors 104 at the sampling time.

At block 302, a leak detection sensor 104 may be monitoring leak detection information associated with a fluid, such as water or gas, in the pipes 108 over a time interval, which may be predetermined or dynamically determined, at a corresponding location 106 of the leak detection sensor 104 as shown in FIG. 1. In this example, water as the fluid is used to describe the process. The leak detection information may comprise a flow rate of the water and leak detection data associated with the water. In addition, a pressure of the water may also be monitored and included in the leak detection information. For example, when the leak detection sensors 104 are initially activated, the leak detection information from each leak detection sensor 104 may be collected over a time interval, such as a day, several days, a week, or other desired and appropriate period of time. The leak detection information may be collected and stored individually by the leak detection sensors 104, collected, stored, and distributed among the leak detection sensors 104, or collected by the controller unit 102 as described with reference to FIG. 1.

While an externally powered leak detection sensor, such as one powered by an external power supply connected to an AC outlet, may continuously monitor and collect the leak detection information, a battery-powered leak detection sensor may, instead, monitor and collect the leak detection information periodically, for example, every five minutes for a monitoring period of five seconds, over the 24-hour period to conserve the battery power.

At block 304, a sampling time may be determined based on the monitored flow rate and/or the monitored pressure of the water. For example, as discussed above with reference to FIG. 2, the sampling time may be determined to be when the monitored flow rate is at a minimum during the time interval because individual leak detection sensors will always have a respective minimum flow rate. For a group of a plurality of leak detection sensors, the sampling time may also be selected based on a threshold flow rate below which the flow rate is considered to be sufficiently low. For a large group of a plurality of leak detection sensors, it would be unlikely that all leak detection sensors of the group individually measure the minimum flow rate at the same time. Therefore, when or if an average flow rate associated with the group of the plurality of leak detection sensors were below a threshold flow rate, it could be determined as an appropriate time to sample. By using the threshold flow rate, it would allow determining a coordinated sample time even when a leak detection sensor of the group were measuring the maximum amount of flow rate at that moment.

Alternatively, the sampling time may be determined to be when the monitored pressure is at a maximum during the time interval or when the monitored pressure is higher than a threshold pressure, which may or may not coincide with the monitored minimum flow rate. The pressure at specific locations may be determined based on hydraulic modeling solution. With the hydraulic model over a specific geographical area of the pipe network calibrated, the pressure throughout the specific geographical area of the pipe network at multiple locations over the 24 hour period may be predicted.

In some examples, a sampling time may be selected based on some combination of flow rate and pressure. For instance, leak detection data may be sampled at a time when the flow rate is relatively low, but not at the minimum, and the pressure is relatively high, but not at the maximum. While the sampling time may be ideally when the flow rate is at the minimum and the pressure is at the maximum, the sampling time may also be determined based on the population of the leak detection sensors and their consumption patterns. For example, if some leak detection sensors were known to hear at a certain period a consumption noise that likely is a leak, the results may be weighed. For a given area, if one leak detection sensor (local leak detection sensor) makes its recordings at the quietest time and other surrounding leak detection sensors make their recordings at some other quiet time, the spectral signatures of all the leak detection sensors may analyzed to determine whether a stationary signal, or a common spectral pattern, exists that is detected by the local and surrounding leak detection sensors. This would enhance the confidence that a leak is present.

For example, when the leak detection sensors 104 are initially activated, the leak detection information from each leak detection sensor 104 may be collected over the time interval, such as a day, several days, a week, or other desired and appropriate period of time. The leak detection information may be collected and stored individually by the leak detection sensors 104, collected, stored, and distributed among the leak detection sensors 104, or collected and stored by the controller unit 102 as described with reference to FIG. 1. Additionally, the time interval, for example, a 24-hour period, may be repeated periodically to revise the sampling time as needed or desired, and the sampling time may include one or more sampling times within the time interval if appropriate. The leak detection sensor 104 may also sample the leak detection data at a time offset by a predetermined offset time interval from the sampling time for comparing the leak detection data. As discussed with reference to FIG. 1, the sampling time may be determined by each leak detection sensor 104 individually based on respective leak detection information, by coordinating among the leak detection sensors 104 based on leak detection information from some or all of the leak detection sensors 104, or by the controller unit 102 based on leak detection information from some or all of the leak detection sensors 104. The sampling time may be determined to be a common sampling time for the leak detection sensors 104.

Once the sampling time is determined, the leak detection sensors 104 may manage the leak detection data corresponding to the sampling time at block 306. For example, an individual leak detection sensor 104 may analyze the leak detection data, such as acoustic data collected at the sampling time, by converting the acoustic data in the time domain to frequency domain data, via Fourier transform for example, to produce corresponding spectral representation and performing spectral analysis of the spectral representation to identify a noise and/or leak signature. Alternatively, the acoustic data may be communicated among the leak detection sensors 104 and analyzed via distributed intelligence or edge computing at one or more of the leak detection sensors 104 or be transmitted from each leak detection sensor 104 to the controller unit 102 for the analysis. At block 308, the leak detection sensors 104, via distributed intelligence or edge computing at one or more of the leak detection sensors 104, or the controller unit 102, may determine the leak location based on the spectral analysis, the topology of the pipes 108, and leak detection sensor locations 106.

Figure 4:
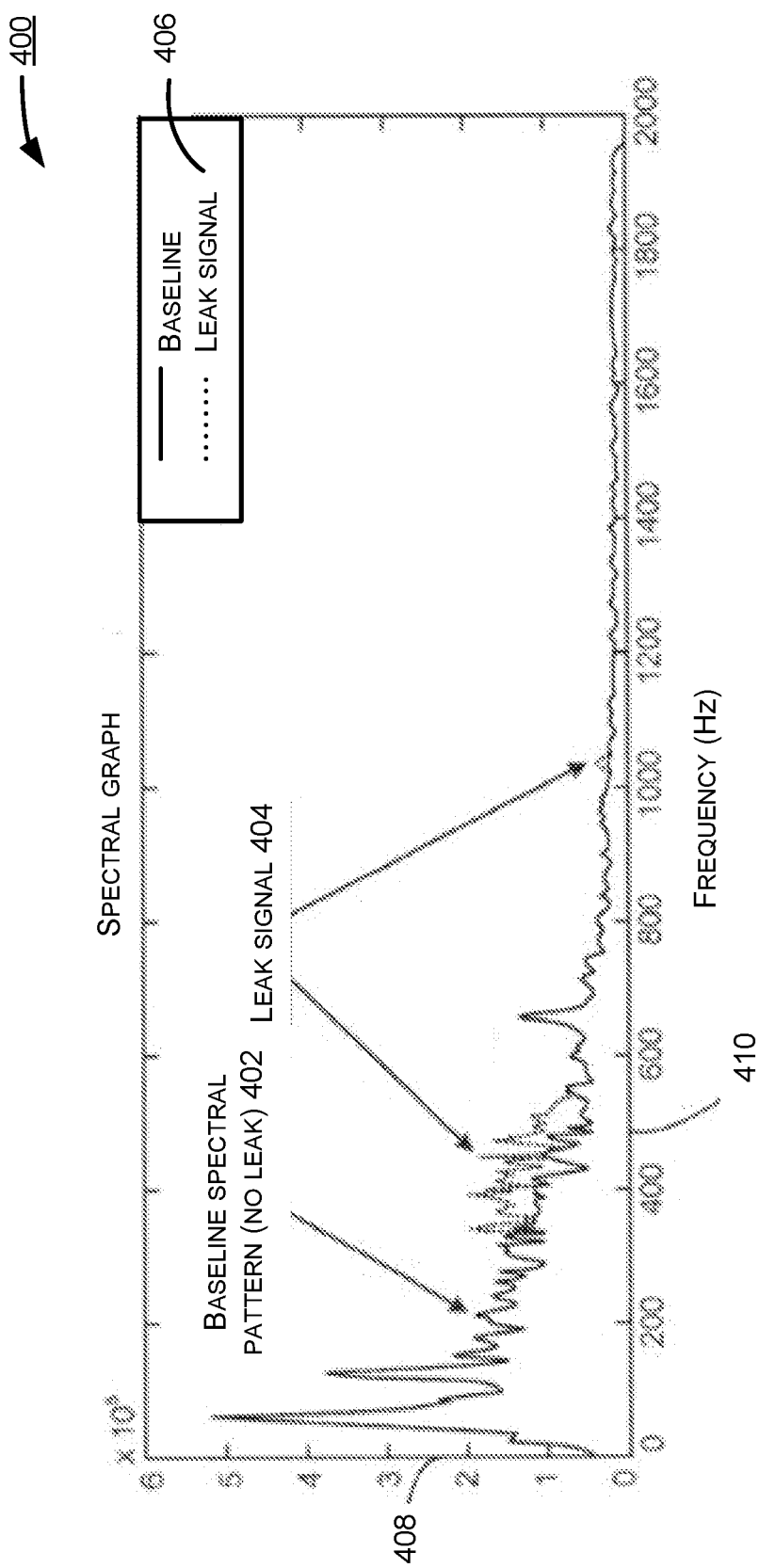
FIG. 4 illustrates an example spectral graph representing the acoustic data collected by the leak detection sensor at the sampling time.

FIG. 4 illustrates an example spectral graph 400 representing the acoustic data collected by the leak detection sensor 104 at the sampling time. As discussed above, the spectral graph 400 may be generated by transforming the acoustic data from the time domain to the frequency domain via Fourier transform, and analyzed by the leak detection sensor 104 or by the controller unit 102. The spectral graph 400 shows an example comparison of a baseline spectral pattern 402 with no leak (solid line) to a current spectral pattern with a leak signal where the difference indicates a leak signal 404 (dotted line). The baseline spectral pattern 402 may be averaged over multiple sampling times or over multiple samples from the leak detection sensors 104 at the same sampling time. The spectral graph 400 includes a legend 406, a vertical axis 408 indicating an acoustic amplitude, and a horizontal axis 410 indicating an acoustic frequency in Hertz (Hz).

In some examples, the difference between the current spectral pattern and the baseline spectral pattern 402 is determined and/or calculated by taking an integral of a difference between the current spectral pattern and the baseline spectral pattern 402. In other words, sum areas of the current spectral pattern and the baseline spectral pattern 402 may be subtracted from one another to determine the difference. Additionally, or alternatively, overall shapes of waveforms corresponding to the current spectral pattern and the baseline spectral pattern 402 may be compared to one another to determine this difference, which may be referred to as a correlation.

In some examples, the difference between the current spectral pattern and the baseline spectral pattern 402 may be determined by quantifying a maximum numerical difference in amplitude. In particular, the maximum difference at a certain frequency between the current spectral pattern and the baseline spectral pattern 402 may be selected to determine a leak condition, for example.

Additionally, or alternatively, at least one peak and/or characteristic shape of the current spectral pattern, for example, the leak signal 404, may be tracked as it shifts over time (e.g., while generally retaining aspects of its characteristic waveform) and this shift may also be considered when comparing the current spectral pattern to the baseline spectral pattern 402. In such examples, spectral tracking can be effective at tracking peak and/or waveform shifts based on edges of the current spectral pattern that are clearly defined in the frequency domain.

Figure 5:
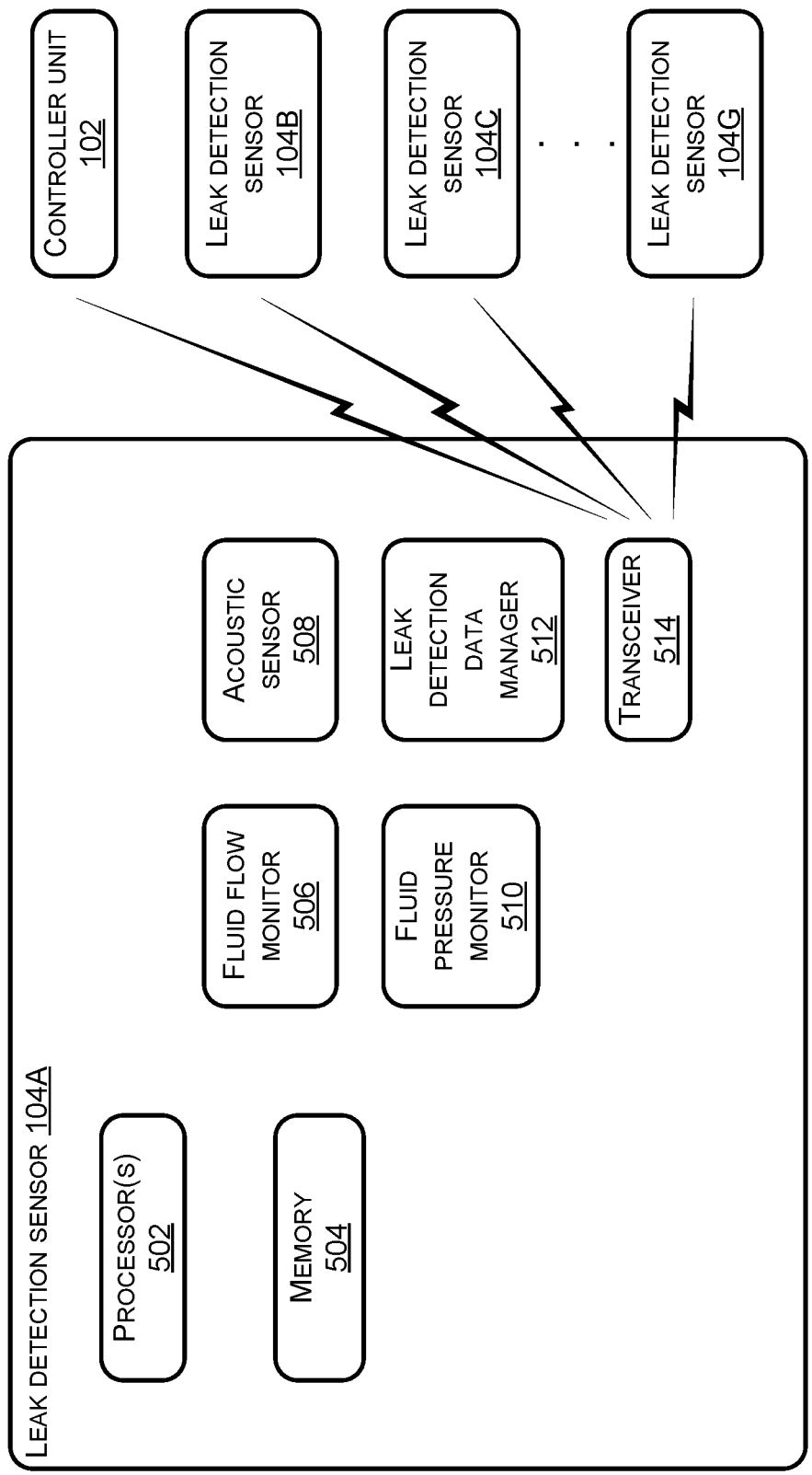
FIG. 5 illustrates an example block diagram of a leak detection sensor.

FIG. 5 illustrates an example block diagram of a leak detection sensor 104A as an example of the leak detection sensors 104.

The leak detection sensor 104A may be attached to the pipes 108 as discussed with reference to FIG. 1. The leak detection sensor 104A may comprise one or more processors (processors) 502 communicatively coupled to memory 504. The processors 502 may include one or more central processing units (CPUs), graphics processing units (GPUs), both CPUs and GPUs, or other processing units or components known in the art. The processors 502 may execute computer-executable instructions stored in the memory 504 to perform functions or operations with one or more of components communicatively coupled to the one or more processors 502 and the memory 504 as described above with reference to FIGS. 1-4. Depending on the exact configuration of the leak detection sensor 104A, the memory 504 may be volatile, such as RAM, non-volatile, such as ROM, flash memory, miniature hard drive, memory card, and the like, or some combination thereof. The memory 504 may store computer-executable instructions that are executable by the processors 502.

A fluid flow monitor 506 for monitoring flow of the fluid in the pipes 108, an acoustic sensor 508 for monitoring leak detection data associated with the fluid in the pipes 108, a fluid pressure monitor 510 for monitoring pressure of the fluid in the pipes 108, and a leak detection data manager 512 for processing the leak detection data monitored at a sampling time.

As discussed above, with reference to FIGS. 1-3, the leak detection sensor 104A may monitor leak detection information in the pipes 108, such as the flow of the fluid via the fluid flow monitor 506, the pressure of the fluid via the fluid pressure monitor 510, and the leak detection data via the acoustic sensor 508, at its corresponding location 106 over a time interval, such as a 24-hour period. The leak detection data manager 512 may determine the sampling time based at least in part on the monitored flow of the fluid by the fluid flow monitor 506 and/or the monitored pressure of the fluid by the fluid pressure monitor 510. For example, the leak detection sensor 104A may collect and store the leak detection information locally in the memory 504 and analyze the leak detection data. The leak detection data manager 512 may then determine the sampling time to be when the monitored flow is at a minimum during the time interval, or when the monitored pressure is at a maximum during the time interval. Additionally, the leak detection data manager 512 may perform spectral analysis of the leak detection data and generate a spectral analysis result.

The leak detection sensor 104A may further comprise a transceiver 514 for establishing a communication with one or more other leak detection sensors or with the controller unit 102. The transceiver 514 may transmit the leak detection data, which may include the acoustic data, spectral representation of the acoustic data, and the spectral analysis result, to a controller unit 102 or to one or more other leak detection sensors 104 (the leak detection sensors 104B-104G are shown in this example). The leak detection data may be communicated among the leak detection sensors 104 as shown in FIG. 1 and analyzed via distributed intelligence or edge computing at one or more of the leak detection sensors 104. Alternatively, the leak detection data may be transmitted from each leak detection sensor 104 to the controller unit 102 for the analysis. Additionally, the transceiver may communicate with the one or more other leak detection sensors 104, exchange the respective monitored flow of the fluid in the pipes 108, and the leak detection data manager 512 may determine a common sampling time for all or a sub-group of the leak detection sensors 104.

The processors 502, via distributed intelligence or edge computing at one or more of the leak detection sensors 104, or the controller unit 102, may then determine a leak location based on the spectral analysis, the topology of the pipes 108, and leak detection sensor locations 106.

FIG. 6 illustrates an example block diagram of a controller unit 102.

The controller unit 102 may comprise one or more processors (processors) 602 communicatively coupled to memory 604. The processors 602 may include one or more central processing units (CPUs), graphics processing units (GPUs), both CPUs and GPUs, or other processing units or components known in the art. The processors 602 may execute computer-executable instructions stored in the memory 604 to perform functions or operations with one or more of components communicatively coupled to the one or more processors 602 and the memory 604 as described above with reference to FIGS. 1-4. Depending on the exact configuration of the controller unit 102, the memory 604 may be volatile, such as RAM, non-volatile, such as ROM, flash memory, miniature hard drive, memory card, and the like, or some combination thereof. The memory 604 may store computer-executable instructions that are executable by the processors 602.

The controller 102 may comprise a transceiver 606 for receiving the leak detection information from one or more leak detection sensors 104 and a sampling time module for determining the sampling time based on the leak detection data. As described above with reference to FIGS. 1-3 and 5, the controller unit 102, that is a sampling time processor 608 of the controller unit 102, may determine, or coordinate, the individual sampling time for each leak detection sensor, the common sampling time for a group of leak detection sensors, or one or more sampling times for one or more subgroups of the group of leak detection sensors based on the topology and leak detection sensor locations. The received leak detection information and the sampling time(s) may be in the memory 604. The sampling time(s) may then be communicated with, or transmitted to, via the transceiver 606, to the leak detection sensors 104.

The controller unit 102 may further comprise a leak detection data analyzer 610 for analyzing the leak detection data received from the leak detection sensors 104. The leak detection data analyzer 610 may analyze the leak detection data, such as acoustic data collected at the sampling time, by converting the acoustic data in the time domain to frequency domain data, via Fourier transform for example, to produce corresponding spectral representation and performing spectral analysis of the spectral representation to identify a noise and/or leak signature. The leak detection data analyzer may then determine a leak location based on the spectral analysis, the topology of the pipes 108, and leak detection sensor locations 106.

The controller unit 102 may further comprise a communication module 612 allowing the controller unit 102 to communicate with other device(s), system(s), a central office, and/or a user working with the controller unit 102, collectively shown as an entity 614 over a network 616. For example, the controller unit 102, via the communication module 612, may communicate the leak location to a utility worker trouble-shooting the pipes 108 for a leak. The network 616 may include the Internet, wired media such as a wired network or direct-wired connections, and wireless media such as acoustic, radio frequency (RF), infrared, cellular networks, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transitory computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media, when executed by one or more processors, may perform operations described above with reference to FIGS. 1-6. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by a leak detection sensor, the method comprising:
monitoring leak detection information associated with a fluid in a fluid transporting medium over a time interval, the leak detection information comprising:
a monitored flow of the fluid in the fluid transporting medium,
a monitored pressure of the fluid in the fluid transporting medium, and
leak detection data associated with the fluid in the fluid transporting medium; and
processing the leak detection data monitored at a sampling time in the time interval to identify leaks in the fluid transporting medium, the sampling time determined based at least in part on the monitored flow of the fluid and a time when the monitored pressure of the fluid is at a maximum or above a threshold pressure during the time interval.

2. The method of claim 1, wherein the leak detection sensor is coupled to the fluid transporting medium.

3. The method of claim 1, wherein
the sampling time is determined further based on
a time when the monitored flow is at a minimum or below a threshold flow during the time interval.

4. The method of claim 1, wherein the sampling time includes an offset sampling time offset by a predetermined offset time interval from the sampling time initially determined based at least in part on the monitoring.

5. The method of claim 1, wherein processing the leak detection data comprises:
performing spectral analysis of the leak detection data; and
generating, based at least in part on a spectral analysis result, an indication of a leak in the fluid transporting medium.

6. The method of claim 1, wherein the leak detection sensor is one of a plurality of leak detection sensors, and the method further comprising:
receiving, from one or more other leak detection sensors of the plurality of leak detection sensors, respective leak detection information at a respective sampling time based at least in part on a respective monitored pressure and a respective monitored flow over the time interval.

7. The method of claim 6, wherein determining the respective sampling time includes:
coordinating among the plurality of leak detection sensors; and
determining a common sampling time for the plurality of leak detection sensors.

8. The method of claim 6, wherein determining the respective sampling time includes:
selecting a group of leak detection sensors from the plurality of leak detection sensors; and
determining a common sampling time for the group of leak detection sensors from the plurality of leak detection sensors.

9. The method of claim 6, further comprising:
performing spectral analysis of the respective leak detection information at the respective sampling time; and
determining, based at least in part on the spectral analysis, a location of a leak.

10. The method of claim 9, wherein the location of the leak is determined based at least in part on a respective spectral analysis result, a topology of the fluid transporting medium, and a respective location of each leak detection sensor of the plurality of leak detection sensors.

11. A leak detection sensor comprising:
one or more processors; and
memory communicatively coupled to the one or more processors, the memory storing thereon computer executable instructions that, when executed by the one or more processors, cause the leak detection sensor to perform operations comprising:
monitoring leak detection information associated with a fluid in a fluid transporting medium over a time interval, the leak detection information comprising:
a monitored flow of the fluid in the fluid transporting medium,
a monitored pressure of the fluid in the fluid transporting medium, and
leak detection data associated with the fluid in the fluid transporting medium; and
processing the leak detection data monitored at a sampling time in the time interval to identify leaks in the fluid transporting medium, the sampling time determined based at least in part on the monitored flow of the fluid and a time when the monitored pressure of the fluid is at a maximum or above a threshold pressure during the time interval,
wherein the leak detection sensor is configured to be attached to the fluid transporting medium.

12. The leak detection sensor of claim 11, wherein the sampling time is determined further based on
a time when the monitored flow is at a minimum or below a threshold flow during the time interval.

13. The leak detection sensor of claim 11, wherein processing the leak detection data comprises:
performing spectral analysis of the leak detection data, and
generating, based at least in part on a spectral analysis result, an indication of a leak in the fluid transporting medium.

14. The leak detection sensor of claim 11, wherein the leak detection sensor is one of a plurality of leak detection sensors, and
the operations further comprise:
receiving, from one or more other leak detection sensors of the plurality of leak detection sensors, respective leak detection information at a respective sampling time based at least in part on a respective monitored pressure and a respective monitored flow over the time interval.

15. The leak detection sensor of claim 14, wherein the operations further comprise:
performing spectral analysis of the respective leak detection information at the respective sampling time; and
determining, based at least in part on the spectral analysis, a location of a leak.

16. The leak detection sensor of claim 15, wherein the location of the leak is determined based at least in part on a respective spectral analysis result, a topology of the fluid transporting medium, and a respective location of each leak detection sensor of the plurality of leak detection sensors.

17. A method performed by a controller unit, the method comprising:
receiving, from a plurality of leak detection sensors, respective monitored leak detection information associated with a fluid in a fluid transporting medium over a time interval, the respective leak detection information comprising:
a respective monitored flow of the fluid in the fluid transporting medium,
a respective monitored pressure of the fluid in the fluid transporting medium, and
respective leak detection data associated with the fluid in the fluid transporting medium; and
processing the respective leak detection data monitored at a sampling time in the time interval to identify leaks in the fluid transporting medium, the sampling time determined based at least in part on the respective monitored flow of the fluid and a time when the respective monitored pressure of the fluid is at a maximum or above a threshold pressure during the time interval.

18. The method of claim 17, wherein
the sampling time is determined further based on
a time when the respective monitored flow is at a minimum or below a threshold flow during the time interval.

19. The method of claim 17, further comprising:
performing spectral analysis of the respective leak detection information at the sampling time; and
determining, based at least in part on the spectral analysis, a location of a leak.

20. The method of claim 19, wherein the location of the leak is determined based at least in part on a respective spectral analysis result, a topology of the fluid transporting medium, and a respective location of each leak detection sensor of the plurality of leak detection sensors.

* * * * *